Nov. 23, 1965  R. L. APPLETON  3,219,137
ELECTRIC CART DRIVING AND SUSPENSION ARRANGEMENT
Filed June 29, 1961  5 Sheets-Sheet 1

INVENTOR.
RICHARD L. APPLETON
BY
J. William Freeman
ATTORNEY

Nov. 23, 1965  R. L. APPLETON  3,219,137
ELECTRIC CART DRIVING AND SUSPENSION ARRANGEMENT
Filed June 29, 1961  5 Sheets-Sheet 2

FIG. 3

INVENTOR.
RICHARD L. APPLETON
BY
J. William Freeman
ATTORNEY

Nov. 23, 1965   R. L. APPLETON   3,219,137
ELECTRIC CART DRIVING AND SUSPENSION ARRANGEMENT
Filed June 29, 1961   5 Sheets-Sheet 3

INVENTOR.
RICHARD L. APPLETON
BY
ATTORNEY

Nov. 23, 1965    R. L. APPLETON    3,219,137
ELECTRIC CART DRIVING AND SUSPENSION ARRANGEMENT
Filed June 29, 1961    5 Sheets-Sheet 4

INVENTOR.
RICHARD L. APPLETON
BY
J. William Freeman
ATTORNEY

Nov. 23, 1965 R. L. APPLETON 3,219,137
ELECTRIC CART DRIVING AND SUSPENSION ARRANGEMENT
Filed June 29, 1961 5 Sheets-Sheet 5

INVENTOR.
RICHARD L. APPLETON
BY
William Freeman
ATTORNEY

United States Patent Office 3,219,137
Patented Nov. 23, 1965

3,219,137
ELECTRIC CART DRIVING AND SUSPENSION ARRANGEMENT
Richard L. Appleton, Cuyahoga Falls, Ohio, assignor to Ace Machine Company, Cuyahoga Falls, Ohio, a partnership of Ohio
Filed June 29, 1961, Ser. No. 123,080
2 Claims. (Cl. 180—26)

This invention relates to the art of electrically operated land vehicles and in particular has reference to a smaller type of vehicle that is conventionally referred to as an electric cart and which is used for transporting persons around localized areas.

While the art of electrically powered vehicles, is, per se, old, the recent introduction of electric carts of the character described has created certain problems with respect to the construction and operation of these vehicles.

It has heretofore been considered expedient to provide such vehicles with a rear wheel type of drive, with the result that a rather expensive and costly type of construction has been necessary in order to provide traction in the rear area of the cart. Additionally, and from a construction standpoint, specific problems have arisen with respect to the braking and other safety features of such devices.

It has been further found that cart construction of the type above described can be improved by providing a rigid frame that encircles the entire unit so that impact occurring upon collision is, in fact, absorbed by the encircling frame rather than by the wheel or body units as is normally the case. Additionally, and by positioning this frame in a more or less "low slung" position of encirclement around the body of the cart, it has been found that the frame per se will serve as an anti-tipping means to prevent overturning of the cart.

Other advantages in cart construction that are envisioned by the present invention include use of a front wheel drive which is carried by the front wheel housing and which serves to provide a positive drive that eliminates the problems attendant to rear wheel drive types of construction. Additionally, and with respect to the above-mentioned type of front wheel construction, it has been further found that improved results can be achieved by providing a combination of a tiller type of steering that is achieved by the eccentric location of a more or less conventional automobile type steering wheel. Thus, from a safety standpoint, the disadvantages of a tiller type steering unit are avoided, while the advantages thereof are retained by virtue of the eccentric positioning of the steering wheel on the control column for the front wheel drive.

Production of an improved electric cart having the above advantages becomes the principal object of this invention, with other objects thereof becoming more apparent upon a reading of the following brief specification, considered and interpreted in the light of the accompanying drawings.

Figure 1:
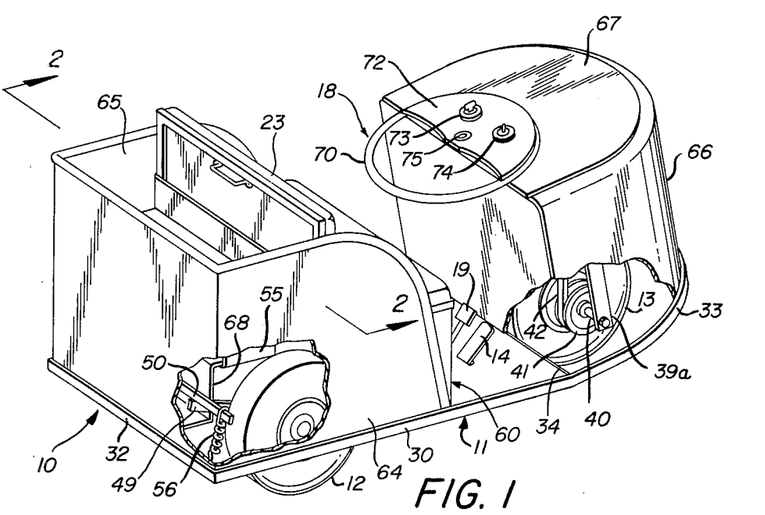
FIGURE 1 is a perspective view partly broken away for illustration purposes and showing the improved electric cart.

Referring now to the drawings and in particular to FIGURE 1 thereof, the improved electric cart, generally designated by the numeral 10, is shown as including a main body supporting frame 11 that is shiftably supported with respect to opposed rear wheels 12, 12 and a front wheel 13.

An accelerator pedal 14 controls the operation of electrical transmission means 15 so as to regulate the amount of current that is delivered from the batteries or fuel cells 16, 16 to drive means 17 (FIGURE 3) that are carried with respect to the front wheel 13. Steering is effectuated by steering mechanism 18, while brake pedal 19 controls a hydraulic brake cylinder 20, with automatic brake means 21 serving also to automatically actuate a braking drum mechanism 22 upon shifting movement of seat 23.

In view of the complexity of the device, the various main components thereof will be separately described, as will the operation thereof.

The frame 11

Figure 2:
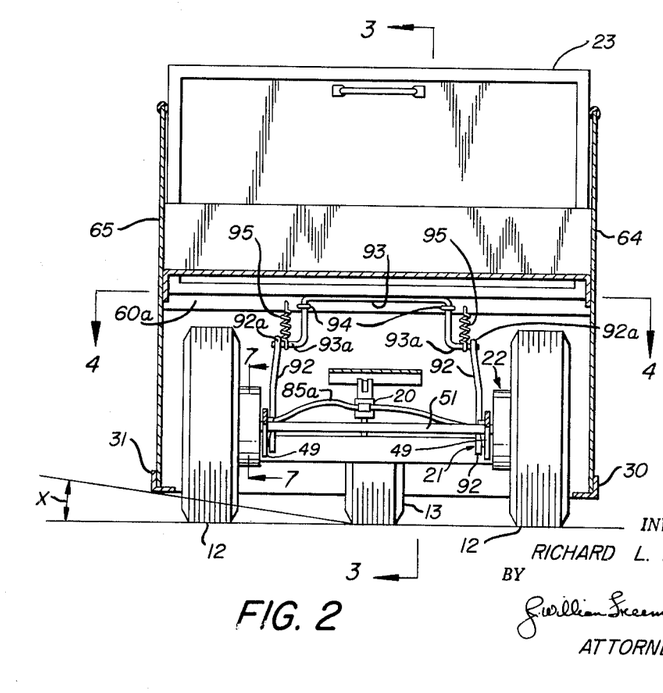
FIGURE 2 is a vertical section taken on the lines 2—2 of FIGURE 1.
Figure 3:
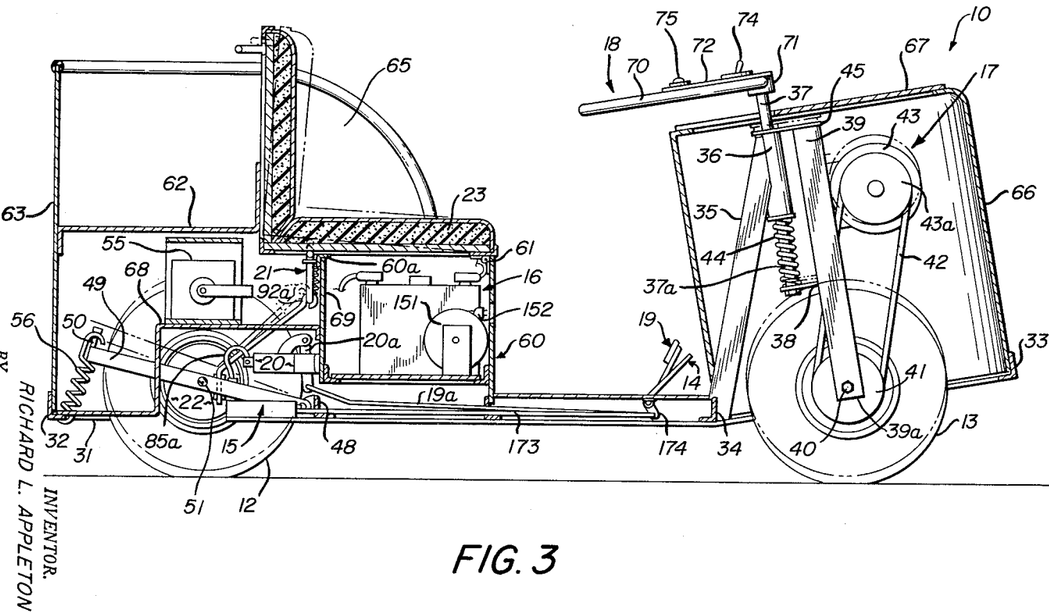
FIGURE 3 is a vertical section taken longitudinally of the unit on the lines 3—3 of FIGURE 2.

Referring now to FIGURES 1 to 3 for a detailed description of the frame 11, it will first be noted that the same includes preferably parallel elongate side frame elements 30 and 31 that are disposed in opposed relationship to each other so as to be positioned outboard of the wheels 12, 12, and 13, with the side frame elements 30 and 31 being interconnected at their rear portion by a transverse frame member 32, while the front portion of the side frame members 30 and 31 terminates in a rounded front frame element 33 (see FIGURES 1 and 3). In this fashion an endless frame of a surrounding nature is provided for the unit 10. Also, and as best shown in FIGURE 2, this endless frame is preferably "low slung" so that an angle "X" is provided between the front wheel 13 and the frame elements for anti-tipping purposes.

For the purpose of shiftably supporting the front wheel 13, the frame unit 11 further includes a transverse frame element 34 (FIGURE 3) that extends transversely thereof and has welded thereto a front wheel supporting frame 35, with the frame member 35 having a bushing 36 within which a trunnion or pivot shaft 37 may be rotatably journaled as clearly shown in FIGURE 3 of the drawings. The lower end 37a of this trunnion is shown fixed with respect to a support plate 38 that is provided on the front wheel frame 39, with the front wheel frame 39 including forked leg elements 39a, 39a that straddle the front wheel 13 as clearly shown in FIGURES 1 and 3 of the drawings. In this fashion an axle 40 can be supported between projecting ends of the depending leg portions 39a, 39a so as to rotatably journal the wheel 13 thereon as clearly shown in FIGURE 1. A drive sheave 41 is fixed with respect to the shaft 40 so as to receive belt 42 that is played around the drive sheave 43a of motor 43, with motor 43 being fixedly secured with respect to frame member 39, as clearly shown in FIGURE 3 of the drawings. Also, and for the purpose of providing a cushioned ride, a spring 44 is shown encircling the lower end 37a of trunnion 37, with the opposed ends of spring 44 bearing against bushing 36 and the plate 38 so as to tensionally urge these members apart with separation of the two members being limited by a plate 45 that is fixed to the upper end of frame 39.

Figure 4:
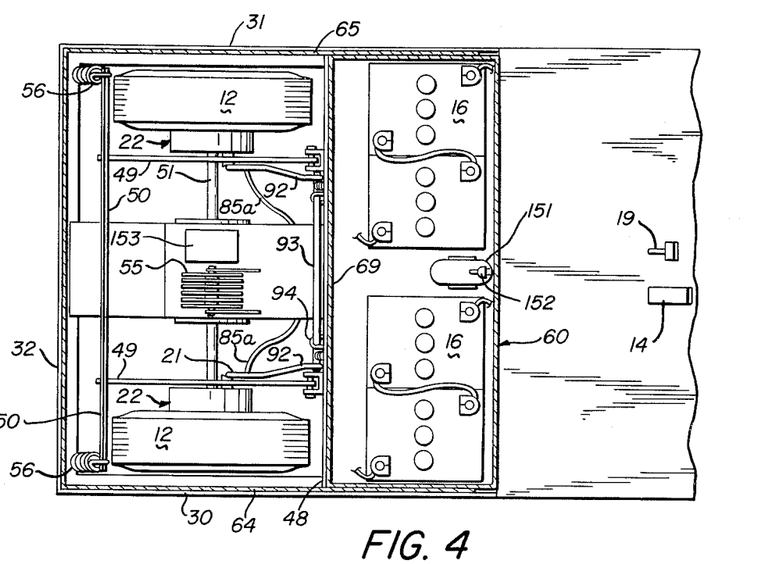
FIGURE 4 is a plan view of the rear portion of the electric cart, with certain portions of the housing being eliminated for the sake of clarity.

In addition to the aforementioned component parts, the frame member 11 further includes a rearwardly positioned transversely extending frame element 48 that interconnects the side frame elements 30 and 31 and that serves as a point of pivotal support for the rearwardly projecting arms 49, 49, with the arms 49, 49 being welded or otherwise secured to a cross arm 50 (FIGURE 1) so as to, in effect, provide a U-shaped support frame that is pivoted with respect to the frame element 48. Journaled between the rearwardly extending arms 49, 49 is an axle 51 that rotatably supports, adjacent its outer ends, the wheel members 12, 12, with this condition of component parts being best illustrated in FIGURES 2 and 4 of the drawings. A brake drum, previously generally designated by the numeral 22 (FIGURES 2, 3 and 6) is secured with respect to each wheel element 12 for operation, as will subsequently be described.

For the purpose of improving the riding qualities of the just described unit, a pair of springs 56, 56 are shown interconnecting the member 50, with the rear frame element 32, with these springs serving to urge these just described members towards each other so as to provide a spring type of cushioned ride for the entire unit, with similar cushioning of the front wheel 13 being achieved by the spring 44, as has been described.

In addition to the aforementioned component parts and as shown in FIGURE 1, the frame element further includes a seat housing that is generally designated by the numeral 60 in FIGURE 3 of the drawings, with this seat housing 60 serving to perform the additional function of supporting the current source 16, as well as to hingedly support, by hinge 61, the seat member 23, with the rear portion of this seat resting on frame element 60a and with the back portion of the seat 23 contacting a body element 62, as clearly shown in FIGURE 3 of the drawings. A rear cover panel 63, side cover panels 64 and 65 (FIGURE 2) front cover panel 66 and dash panel 67 (FIGURES 1 and 3) define the external body portion of the frame member 11, while additional internal support in the form of transverse support panels 68 and 69 (FIGURE 3) are provided for supporting rectifier 55 and other components as will be described.

In order that steering may be achieved as shown in FIGURES 1 and 3 of the drawings, the steering means 18 is shown as including a cylindrical wheel 70 that is eccentrically journaled, as by bushing 71, around the upper or free end of the trunnion or pivot shaft 37, with the wheel 70 being partially spanned by a cover plate 72 upon which a key switch 73, a forward-reverse switch 74 and a horn button 75 may be operatively secured, as shown in the drawings.

*The braking means 22*

While the braking means 22 have been generally described in the preceding paragraphs in connection with the description of FIGURES 1 through 4, inclusive, a detailed description of the same can best be undertaken from an examination of FIGURES 6 through 10, inclusive.

Figure 8:
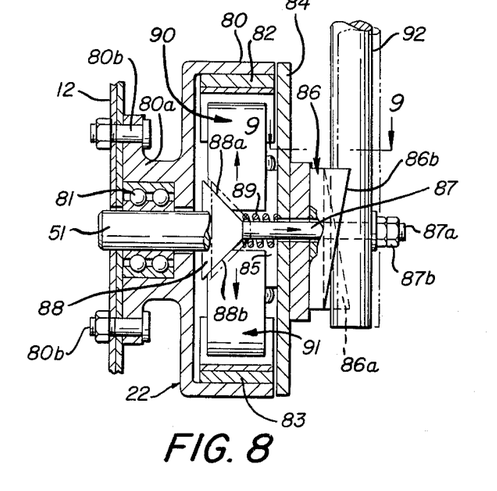
FIGURE 8 is a vertical section taken on the lines 8—8 of FIGURE 7.
Figure 9:
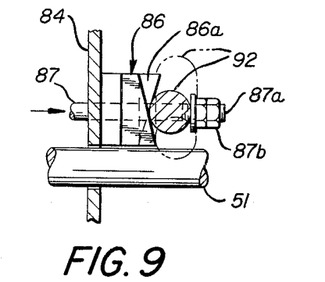
FIGURE 9 is a horizontal section taken on the lines 9—9 of FIGURE 8.
Figure 10:
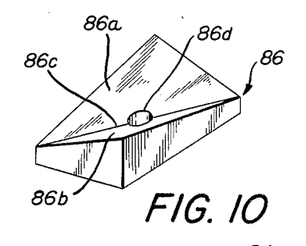
FIGURE 10 is a perspective view of the camming block used in the braking mechanism.

Accordingly, and referring to these figures, it will be seen that the braking mechanism 22 includes a conventional drum housing 80 that has a boss 80a whose flange is fixedly secured with respect to the rear wheel members 12 by use of bolts 80b, 80b, with shaft 51 being rotationally journaled with respect to the housing 80 by the use of ball bearings 81, as clearly shown in FIGURE 8 of the drawings.

For the purpose of effectuating braking action, the revolving drum 80 is acted upon by a pair of brake shoes 82 and 83 that are respectively pivoted as at 82a and 83a (FIGURE 7) to a support plate 84, with this support plate 84 remaining fixed, and with the housing 80 rotating relatively of the same during periods of nonbraking. The brake shoes 82 and 83 are actuated by a conventional type of brake cylinder 85 that receives expanding fluid pressure from line 85a (FIGURES 1, 2 and 4) with this fluid being supplied from the master cylinder 20 as has been previously indicated, and with the expansion of the conventional discs of the brake cylinder 85 serving to separate the braking shoes 82 and 83 around their pivot points against the retracting force of the interconnecting spring 85b.

In this fashion, a conventional braking operation can be obtained when the pedal 19 is depressed so as to actuate a rearwardly extending link arm 19a and thus, in turn, actuate the rocker arm 20a of the master cylinder 20 to thus deliver pressurized fluid to the cylinder 85 and effectuate a braking action.

While a conventional braking during use can be achieved in the manner aforementioned, it is also contemplated that the braking mechanism of the present invention further include provision for an auxiliary type of braking mechanism that operates automatically upon the occupant leaving the seat 23. To this end, the support plate 84 is shown receiving a camming block 86 that is best shown in detail in FIGURE 10 of the drawings, with this camming block 86 being fixed to the plate 84 as clearly shown in the drawings.

Figure 6:
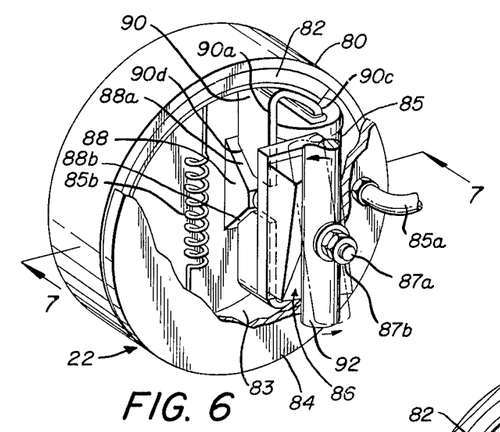
FIGURE 6 is a perspective view of the braking cylinder and showing the automatic brake locking means.
Figure 7:
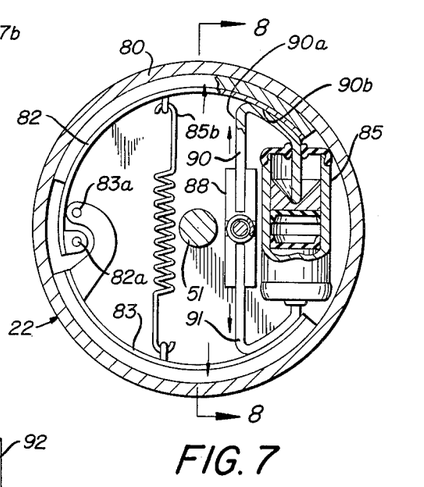
FIGURE 7 is a vertical section taken on the lines 7—7 of FIGURE 6.

Both the camming block 86 and the support plate 84 are apertured to receive a shaft member 87 that has a threaded end 87a upon which a nut 87b may be positioned as shown in FIGURES 6 and 8 of the drawings. The opposite end of the shaft 87 is integrally connected to a separating block 88, with this block 88 including divergent tapering faces 88a and 88b, and with the block 88 being preferably urged away from the member 84 by a spring 89.

Received against the just described surfaces 88a and 88b in sliding relationship therewith are actuating members that are generally indicated by the numerals 90 and 91, with these members being of identical configuration but being opposite hand with respect to each other. Thus, and as indicated best in FIGURES 6 and 7, the member 90 is of generally J-shaped cross-section so as to include a main body portion 90a, a brake shoe attaching segment 90b and a cylinder engaging section 90c, with the section 90a having a tapered corner edge 90d that will slidingly engage the surface 88a as clearly shown in FIGURES 6 and 8 of the drawings. In this regard, the surfaces 88a and 90d are complemental to each other so that the members 90 and 91 will be urged apart upon movement of the block member 88 towards the chain-dotted line position of FIGURE 8.

Additionally, and as indicated above, the portion 90b of member 90 is preferably fixed or otherwise releasably secured to the outer end of the brake shoe 82 so that shifting of the member 90 will cause the brake shoe to be pivoted around the point 82a to thus effectuate braking action, with similar shifting outwardly of the member 91 simultaneously occurring so as to effectuate braking by the shoe 83.

To the end of causing axial shifting of the shaft 87 in the direction of the arrow shown in FIGURE 8, the camming block 86 includes tapering faces 86a and 86b that converge at a diametrically extending low point indicated by the numeral 86c, with aperture 86d being provided for passage of the shaft 87.

Received against the just described surfaces of the camming block 86 is a link arm 92 that is apertured at its lower end so as to be pivotally received around the shaft 87, with this condition of pivotal connection best shown in FIGURES 6 and 8 of the drawings.

Referring now to FIGURE 2, it will be noted that each shaft 92 has a loop end 92a that is received around the outwardly extending flanges 93a, 93a of a U-shaped control member 93, with this U-shaped control member 93 being slidably received in eyelets 94, 94 that are secured to the frame member 60a and with the entire U-shaped frame member 93 being urged to the chain-dotted line position of FIGURE 3 by springs 95, 95. In this manner, the weight of the occupant on the seat 23 will repress the U-shaped frame member to the full line position of FIGURE 3, and this full line position of FIGURE 3 will be the same as the full line position of the member 92 as shown in FIGURE 8.

However, when there is no weight on the seat 23, the member 92 will be pivoted around its point of pivotal attachment to the shaft 87 by the force of springs 95, 95 so that the shaft 87 will be shifted to the right and towards the chain-dotted line position of FIGURE 8 by virtue of the link arm 92 being cammed outwardly by the cam surfaces 86a and 86b. This shifting to the right of the shaft 87 will separate the members 90 and 91 so as to cause an automatic braking action.

When the seat, however, is occupied, the component parts are returned to the full line positions of FIGURES 3 and 8, and it is apparent that this mechanical braking action will be terminated.

In this regard, it is to be understood that the nut 87b serves to adjust the braking pressure that will be applied in any instance, while the spring 89 will return the member 86 to the full line position shown in FIGURE 8.

The electrical circuit

Figure 5:
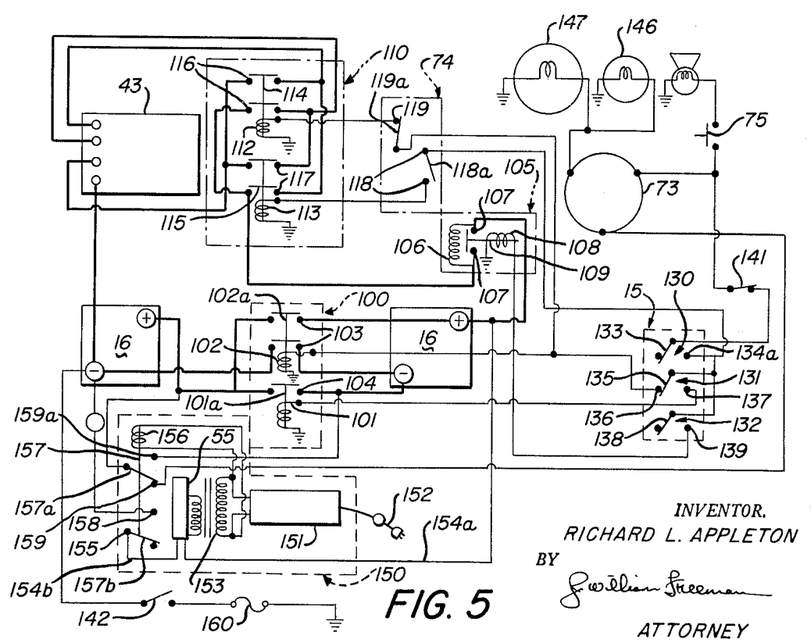
FIGURE 5 is a wiring diagram showing the arrangement of the electrical components employed in the electric cart.

The construction and operation of the electrical circuitry that controls the motivation of the aforementioned cart can best be understood from a detailed examination of FIGURE 5, together with an examination of the semi-schematic views shown in FIGURES 11 through 15, inclusive.

Accordingly, and referring first to FIGURE 5, the main components of the electrical circuitry system are shown as including the motor 43 and the batteries or fuel cells 16, 16, with the batteries or fuel cells 16, 16 serving to operate the motor 43 through a series of switching devices as will now be described.

Accordingly, it should first be understood that the motor and batteries or fuel cells just described constitute the main circuit of the electrical diagram, with all of the switches and actuating mechanisms that will be hereinafter described merely comprising part of what will be referred to as a control circuit of the electro magnetic type. This is believed to be a standard procedure for eliminating the need for switches that are operated by high current and which would accordingly draw a high amount of current. By using this auxiliary type of control circuit, low switches requiring minimal current can be employed to mechanically break the main circuit and thus effectuate control of the circuitry thereof.

It has been previously indicated that one of the main features of this invention relates to a progressively increasing type of power control and for the purpose of first explaining this, it will first be noted from FIGURE 5 that a switch generally designated by the numeral 100 is employed between the batteries 16, 16 for the purpose of selectively arranging the same in either parallel or series.

Accordingly, and referring to the schematic view of FIGURE 5, the switch 100 is shown including hold coils 101 and 102 that respectively operate control switches 101a and 102a, with the switches just described being shown open in FIGURE 5 of the drawings. A series of four contacts 103, 103 are shown adapted to be engaged by the switch 102a, while 104, 104 are adapted to be engaged by the switch 101a. In this fashion when the switch 102a is in engagement with the elements 103, 103 the batteries 16, 16 of FIGURE 5 will be arranged in parallel. Conversely, when the switch 101a is closed so that the same is in contact with elements 104, 104, the batteries 16, 16 will be arranged in series, with it being understood that a mechanical interlock (not shown) is provided for the purpose of preventing both switches 101a and 102a from being in contact at the same time.

Also coacting with the just described switching mechanism 100 is a series resistance type of switch that is generally designated by the numeral 105 in FIGURE 5, with switch 105 including a resistance 106 whose leads are disposed on opposite sides of contact points 107, 107. A hold coil 108 will activate a switch 109 to move the same into or out of electrical contact with the contacts 107, 107. Thus, when the switch 109, which is a normally open type of switch, is in the open position of FIGURE 5, current will be directed through the resistance 106. Conversely, when the switch 109 is closed, the current will flow across the switch and the contacts 107, 107 so as to, in effect, by-pass the resistance 106.

For the purpose of controlling the direction of movement of the cart during operation thereof, the electrical circuitry is further shown as including a forward-reverse switch, generally designated by the numeral 110, and a manually operated control switch that has been designated by the numeral 74. In this regard, the construction of the switch 110 is basically similar to that of the previously described switch 100 so as to include hold coils 112 and 113 that respectively actuate upon being energized by switching elements 114 and 115, with the element 114 being designed for contact with the contacts 116, 116, while the switching element 115 contacts the lower contacts 117, 117. Thus, and because the preferred form of the invention contemplates the use of a direct current series wound type of motor requiring four leads to switch the same from forward to reverse, it is necessary to employ a switch of the type shown in 110, with current flowing across contacts 116, 116 in one direction of movement and flowing across the contacts 117, 117 in the opposite direction of travel.

With regard to the construction of the switch 74, this is a double throw, double pole type of switch so as to include contacts 118, 118, which are shown controlling forward movement of the device while contacts 119, 119 supply power to move the vehicle in the reverse direction with switch elements 118a and 119a being respectively disposed across these contacts for make or break contact therewith, depending upon the position of the manual switching unit 74.

Considering next the acceleration sequence switches, the same are generally illustrated by the numerals 130, 131 and 132 in FIGURE 5 of the drawings, with these switches being shown in schematic positional views in FIGURES 11 through 15 of the drawings, as will be described in subsequent paragraphs.

In essence, and at this point, and for the purpose of describing the electrical circuitry, it suffices to say that the switch 130 includes a shiftable switch element 133 that moves into and out of contact with contact 134a. Similarly, switch 131 includes a swingable switch element 135 that moves between position of contact with elements 136 and 137, with this switch being a single pole, double throw type of switch. Again and with reference to switch 132, the movable switch element 138 thereof moves into and out of electrical contact with contact 139 so that, in effect, the switch 131 is a single pole, double throw, while the switches 130 and 132 are electrically connected as single pole, single throw switches.

The balance of the control elements for controlling the electric circuit above-mentioned include a master key switch 73, a normally closed brake switch 141 and a seat switch 142, with the electrical circuitry being such that opening of any of these just described switches will cause the cessation of current flow between the battery 16 and the motor 43. In this regard, the brake switch 141 is preferably a normally closed type of switch that opens to break the circuit only when the brake pedal 19 is depressed. Conversely, the seat switch 142 is preferably of the normally open type so that when the seat is unoccupied the circuit will be open and no power will be delivered to motor 43. The key switch 73 is shown supplying power to the entire circuit just described, as well as supplyng power for horn button 75, tail light 146 and head light 147, with the switch 73 being preferably of the two positional type so that the same may be moved between an operating position with the tail lights on or off as desired.

For the purpose of recharging the unit, the electrical circuitry herein being considered further includes a battery charger circuit that is generally designated by the numeral 150, with this unit including a reel 151 upon which the charging cord 152 can be tensionally wound so as to be automatically retracted when not in use. In accordance with the known fact that the function of a battery charger is to convert alternating current into direct current, the charger unit 150 includes a transformer 153 that changes the voltage and delivers the desired voltage to the rectifier 55. It will be noted that there are two leads coming from the rectifier 55, with one of these lines 154a shown connected to the positive side of one battery element 16, while the other line 154b terminates in contact 155, with this circuit normally being open during the period that the unit is not being charged.

For the purpose of providing certain safety precautions to the electrical circuitry herein being disclosed, it is preferred that the charging unit have means provided therein to automatically control or break the power circuit, through the medium of the control circuit, during periods of charging so that the vehicle cannot be inadvertently operated while the unit is being charged.

To this end a hold coil 156 is shown as having its leads disposed across the contacts of the transformer 153 so as to receive power therefrom during charging, with the result that the switching element 157 will have its switch contacts 157a and 157b moved when coil 156 is energized, with the switching element 157b moving, during such charging, from the open or neutral position shown in FIGURE 5 to a position of contact with contact 158. Similarly, the switching element 157a will move out of contact with contact 159 and into contact with contact 159a upon actuation of the switch 157 by hold coil 156. In this manner, when the unit is being charged the movement of the switching element 157b into contact with contact 158 will complete the circuitry from the rectifier to the opposed poles of the battery. Similarly, in the position of FIGURE 5, where the element 157a is in contact with element 159, the control circuit is completed and operating but this circuit will be broken when the switching element 157a moves into contact with the element 159a, with such contact serving to also arrange the batteries in series for charging purposes, with the current that is delivered to the minus pole of the left-hand battery 16 (FIGURE 5) emitting from the positive pole thereof and proceeding through switch 157a and contact 159a to the minus pole of the right-hand battery 16.

As best shown in FIGURE 5, the entire circuit is controlled against overload by the provision of a fuse 160 provided in the ground line leading from the battery 16.

*The electrical transmission means 15*

The transmission means 15 are best shown in FIGURES 11 through 15 of the drawings and to this end the same preferably include a housing 170 that is fixed with respect to the frame member 11 so as to be rigidly supported thereon. The opposed end walls 171 and 172 of the housing 170 are apertured to receive a shaft 173 with the shaft 173 being pivotally connected to a rocker arm 174 that is, in turn, pivoted to the floor of the vehicle as shown in FIGURE 3, with the result that depression of the pedal 14 causes rearward (FIGURE 3) shifting of the shaft 173, with spring 175 serving to urge the shaft 173 forwardly of the frame 11.

Fixed with respect to the shaft 173 are three cam blocks 176, 177 and 178, with these cam blocks being designed to operate switches 130, 131 and 132, with each of the switches having the usual roller element that will normally ride on the shaft 173 but that will be actuated and switched upon riding up onto, or dropping off of any cam surface of the cam blocks 176, 177 and 178.

Figures 11, 12, 13, 14, 15:
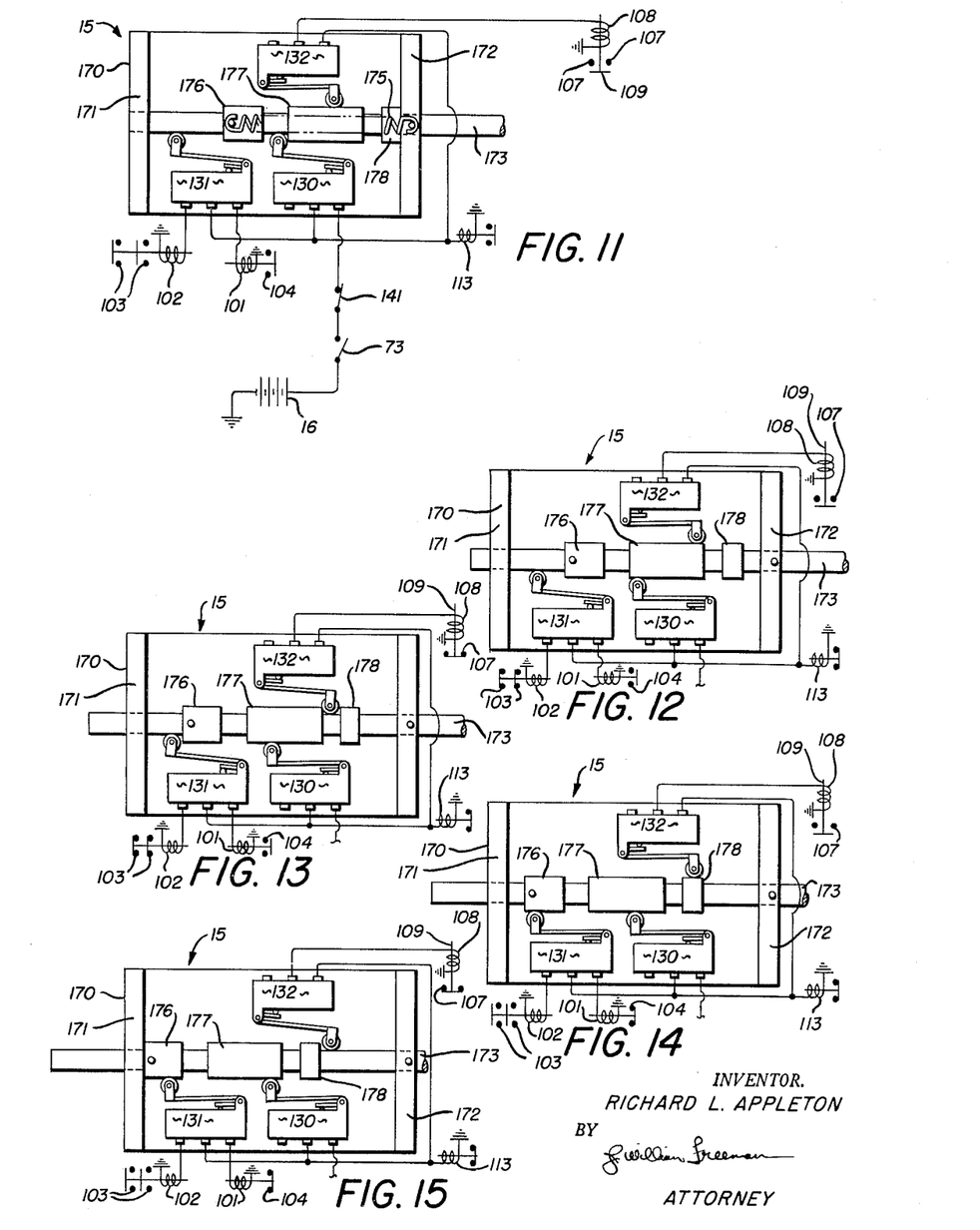
FIGURE 11 is a schematic plan view of the electrical transmission.
FIGURES 12, 13, 14 and 15 are views similar to FIGURE 11, but showing the position of the component parts of the electrical transmission at various stages of operation.

Thus, in FIGURE 11, the roller elements of the switches 130 and 131 are shown in contact with the shaft 173, while the switch 132 is riding on cam block 176. As movement to the position of FIGURE 12 occurs the first thing that happens is that the switch 130 is activated by having roller element moved from engagement with the shaft to engagement with the cam 177.

In FIGURE 13, the switch 132 is similarly activated and in FIGURE 14 both the switches 131 and 132 have been similarly activated with respect to their previous position in FIGURE 13. Final movement comes in FIGURE 15 where the switch 132 is again activated.

For the purpose of co-ordinating the schematic views of FIGURES 11 through 15 with the electrical diagram of FIGURE 5, the various hold coils operated by the switches have been provided on the drawings with switch 132 being shown electrically associated with hold coil 108, while switch 131 is connected electrically to hold coils 101 and 102. Also, the open or closed position of the switching elements of these just described hold coils is shown schematically in each of FIGURES 11 through 15.

*Operation of the electrical circuitry*

The operation of the device from an electrical circuitry standpoint has been partially indicated in the preceding description of the electrical circuitry involved and, accordingly, only a brief resume of operating procedures will be understaken at this point.

Accordingly, and assuming that the cart is idle, it is believed obvious that there will be no power delivered from the batteries 16, 16 to the motor 43 by virtue of the fact that the control circuit is not operating to effectuate the requisite closure of the control elements of switches 110 and 111 and by further view of the fact that the key switch 73 and the seat switch 142 are both open with the result that these elements of the control circuit prevent operation of the vehicle.

Assuming now that a person has entered the vehicle and has become seated upon the seat to close the switch 142 and has further operated the key switch 73 to permit current to pass therethrough, it will now only be necessary that the user operate the switch 74 to select either a forward or reverse direction of travel. Accordingly, and in the form of FIGURE 5, a reverse direction of travel has been selected so that contacts 119, 119 are bridged by switch element 119a.

At this time depression of the accelerator pedal 14 will cause the shaft 173 to move to the left of FIGURE 5. Such depression of the accelerator pedal 15 will cause the switch 130 to be moved to the position of FIGURE 12 and, accordingly, and from a schematic sense, the switch element 133 will now move into contact with element 134a. As a result of this movement there are two things that happen electrically to the unit. First, the hold coil 102 will be energized to cause the switching element 102a to be shifted into contact with contacts 103, 103, with this switching arranging the batteries 16, 16 in parallel. Secondly, current also flows across the contacts 119, 119 to operate the hold coil 112 and thus shift the switching element 114 into closure with contacts 116, 116 so that current to the motor may be obtained. At this time and from an electrical power supply standpoint, the batteries 16, 16 will be operating in parallel and the current will be passing through the resistance 106 so as to move the vehicle by minimal power.

When further depression of the accelerator pedal continues, the switch 132 will be operated as shown in FIGURE 13, with the result that the switching element 138 is shifted into contact with the contact 139 so as to pass current across this contact and, accordingly, activate the hold coil 108 to shift the switch element 109 into contact with the contacts 107, 107. The net effect of this is to remove the resistance 106 from the power circuit so that the voltage increases as a result of the resistance 106 being removed from the circuit. This will result in additional power to the motor 43.

It has been previously indicated that provisions have been made for controlling the amount of power that can be delivered to the motor during reverse operation and this point can best be illustrated by observing the fact that as the accelerator pedal was further depressed to move the component parts to the position of FIGURE 14, the end result will be to move the switch 131 so that the contact 135 thereof shifts into engagement with the contact 137. While this will provide current to activate the hold coil 101 and depress the same, the braking of contact between contact 136 and switch 135 causes a cessation of power being supplied across to switches 110 and 74, with the result that the hold coil 112 will be deactivated and the switching element 114 thereof will move out of contact so that no power is being delivered to the unit in reverse when the component parts are positioned as shown in FIGURES 14 and 15.

It will be assumed, however, that the unit is in the forward position so that the switch element 118a is across contacts 118, 118, while the switch element 119, 119 is out of contact with the elements 119a, then and in that event when the position of FIGURE 14 is reached current flowing across the contact 137 will operate hold coil 101 to close switch element 101a on contacts 104, 104. Simultaneously, the breaking of contact with contact 136 will cause the coil 102 to be deactivated so that the contact between switch element 102a and contacts 103, 103 will be simultaneously broken.

As a result of this just described happening, the batteries 16, 16 will now be arranged in series with the contacts 104, 104. Additionally, it will be noted that switch 132a, has been operated as a result of the movement to position 14 so that the contact 139 is out of contact with the element 138. Thus, the current to hold coil 108 will be deactivated and cause deactivation of the same to cause breaking of the contact between the elements 107, 107 and the switching element 109, with the net result that the resistance 106 is now placed across the power supply caused by the batteries 16, 16 that are now arranged in series. Thus, in the position of FIGURE 14, an increased voltage over that of FIGURE 13 will have occurred, with this voltage being the sum of the voltages of the two batteries minus the drop across the resistance 106.

The final stage of operation is effectuated when the switch 132 is again actuated by falling off of the cam 178 during movement to the position of FIGURE 15. This actuation of the switch 132 will again move the switch element 138 across contact 139 to activate the coil 138 and thus close the switch element 139 against the contacts 107, 107 to thus eliminate the resistance 106 from the power circuit and increase the power source to the maximum supply.

*Operation of the cart per se*

While the operation of the electrical circuitry has been described in the preceding paragraphs, it is believed that the operation of the cart per se should be briefly described.

Accordingly, and to this end it is believed understood that the operation of the motor 43 will, accordingly, transmit driving power to the front wheel 13 to cause the vehicle to move in proportion of the amount of power so delivered. Increase or decrease in the amount of power so supplied will be automatically adjusted by the transmission means 15 operating in response to depression of the accelerator pedal 14. Steering, of course, will be obtained by the steering mechanism 18, which serves to merely turn the front wheels so that the change in direction can be obtained as required.

With regard to braking, normal operational braking will be achieved by depression of the foot pedal 19, which moves link arm 19a forwardly so as to pump fluid from hydraulic cylinder 20 into line 85a and thus effectuate expansion of the cylinder in hydraulic piston 85 so as to spread apart the brake shoes 82 and 83 and brake the vehicle. With regard to the auxiliary brakes, it has been indicated that these brakes will operate automatically when the occupant leaves the seat 23, with the springs 95, 95 automatically urging the U-shaped frame 93 upwardly so as to rock the arms 92, 92 around the pivot point of the shaft 87, with this rotational movement of the link arms 92, 92 effecting an axial shifting of the shaft 87 towards the chain-dotted line positions of FIGURES 3 and 8. Such shifting, of course, results in the members 90 and 91 being spread apart by the wedge block 88 so that the brake shoes 82 and 83 are spread apart automatically upon the seat 23 being moved to the chain-dotted line position of FIGURE 3.

With regard to recharging, it has been noted that recharging may be simply and efficiently effectuated by merely pulling out the charging cord 152 from its wound position on storage reel 151 with current being shut off during such charging by virtue of the switch 157 being actuated to break the current in the power line as has previously been described.

During use of the vehicle, it will be noted that the same will provide a cushioned ride due to the springs 44 and 56 and further that the low slung character of the frame 11 will prevent tipping of the vehicle during sharp turns. If it is desired to operate the vehicle in reverse, it is merely necessary that the switch 74 be operated to reverse the direction of flow to the motor 43, with it being noted that the electrical circuitry is locked out against such shifting when the accelerator pedal 14 is in its fully depressed position.

While a full and complete description of the invention has been set forth in accordance with the dictates of the patent statutes, it is to be understood that the invention is not intended to be limited to the specific form herein shown.

Thus, while a transmission means providing four separate speeds has been shown for the purpose of illustration, it is to be understood that the inventive concept herein set forth is not intended to be limited to the exact form shown, with it being understood that fewer or greater numbers of electro magnetically operated resistances could be positioned in the circuit in similar manner.

Similarly, the inventive concepts of the braking means and the electrical transmission means are not intended to be limited to use only with electric carts, with it being apparent that the inventive concepts contained therein would be equally applicable to uses other than electric cart construction.

Accordingly, modifications of the invention may be resorted to without departing from the spirit hereof or the scope of the appended claims.

What is claimed is:

1. A land vehicle of the character described, comprising; a body supporting frame having front and rear portions; a front wheel supporting standard projecting upwardly from said front portion of said body supporting frame intermediate the opposed side edges thereof and having a support bushing provided on its projecting end; a front wheel frame having a pivot shaft journalled in said bushing whereby relative sliding movement is permitted between said body supporting frame and said front wheel frame; a first plate carried on said pivot shaft adjacent the bottom end thereof and interconnecting said pivot shaft and said front wheel supporting frame; a spring slidably carried on said pivot shaft between said first plate and said bushing; a second plate carried on said pivot shaft adjacent the top end thereof and interconnecting said pivot shaft and said front wheel supporting frame with said spring and said second plate limiting the upward sliding movement of said front wheel frame; a front wheel rotatably carried by said front wheel frame on one end thereof; drive means carried by said front wheel frame and driving said front wheel relatively of said front wheel frame; steering means releasably secured to said pivot shaft and including a wheel eccentrically journalled around the projecting end of said pivot shaft in substantially perpendicular relationship to the longitudinal axis thereof; said steering means rotating said pivot shaft in said bushing; and a pair of rear wheels rotatably mounted with respect to said rear portion of said body supporting frame.

2. A land vehicle of the character described, comprising; a body supporting frame having front and rear portions; a front wheel rotatably carried by said frame adjacent the front portion thereof; drive means carried by said frame and driving said front wheel relatively thereof; steering means connected with said front wheel; and elongate generally U-shaped rear wheel frame having a width slightly less than the width of said body supporting frame and having its open ends pivotally attached to said body supporting frame intermediate the front and rear portions thereof; an elongate axle member extending transversely of said rear wheel frame and having its opposed ends supported by the opposed leg portions of said rear wheel frame; a pair of wheels rotatably journalled on the opposed ends of said axle; a pair of spring means interconnecting the closed rear end of said rear wheel frame with said body supporting frame adjacent the outboard ends of said closed rear end of said rear wheel frame and normally urging said members toward each other under tension whereby said rear wheels are movable in unison relatively of said body supporting frame against the force of said springs.

References Cited by the Examiner

UNITED STATES PATENTS

| | | | |
|---|---|---|---|
| 973,219 | 10/1910 | Schmidt | 280—276 |
| 1,097,358 | 5/1914 | Peck | 318—139 |
| 1,131,979 | 3/1915 | Ackerman | 200—153 |
| 1,139,399 | 5/1915 | Clapp | 74—552 |
| 1,324,194 | 12/1919 | Harries | 318—139 |
| 1,346,915 | 7/1920 | Sauvage | 180—26 |
| 1,474,942 | 11/1923 | Probst | 318—139 |
| 1,534,995 | 4/1925 | Thurstone | 267—20 |
| 1,708,009 | 4/1929 | Burger et al. | 188—109 |
| 1,804,773 | 5/1931 | Hubbell | 188—106 |
| 1,954,931 | 4/1934 | Hambuechen | 320—59 |
| 2,046,952 | 7/1936 | Kaufmann | 320—59 |
| 2,117,141 | 5/1938 | Breer et al. | 320—59 |
| 2,119,052 | 5/1938 | Palmer | 267—20 |
| 2,306,042 | 12/1942 | Custer | 180—65 |
| 2,468,801 | 5/1949 | Beall | 180—26 |
| 2,507,421 | 5/1950 | Rose | 180—27 |
| 2,513,170 | 6/1950 | Harding | 280—276 |
| 2,565,273 | 8/1951 | Shuler et al. | 180—65 X |
| 2,597,735 | 5/1952 | Jepson | 318—139 X |
| 2,675,435 | 4/1954 | Framhein | 200—153 |
| 2,725,488 | 11/1955 | Hueffed et al. | 320—16 |
| 2,767,800 | 10/1956 | Joy | 180—26 |
| 2,839,146 | 6/1958 | Boufford | 180—32 |
| 2,841,251 | 7/1958 | Shelton | 188—78 |
| 2,913,587 | 11/1959 | Gebhard | 320—16 |
| 2,969,855 | 1/1961 | Demorest | 188—106 |
| 3,057,425 | 10/1962 | Proett | 180—65 |

FOREIGN PATENTS 1,097,127  2/1955  France.

MILTON BUCHLER, *Primary Examiner.*

PHILIP ARNOLD, A. HARRY LEVY, *Examiners.*